Aug. 11, 1964    D. H. HATHORN ETAL    3,143,887
DENSITY METERS
Filed Dec. 14, 1959    2 Sheets-Sheet 1
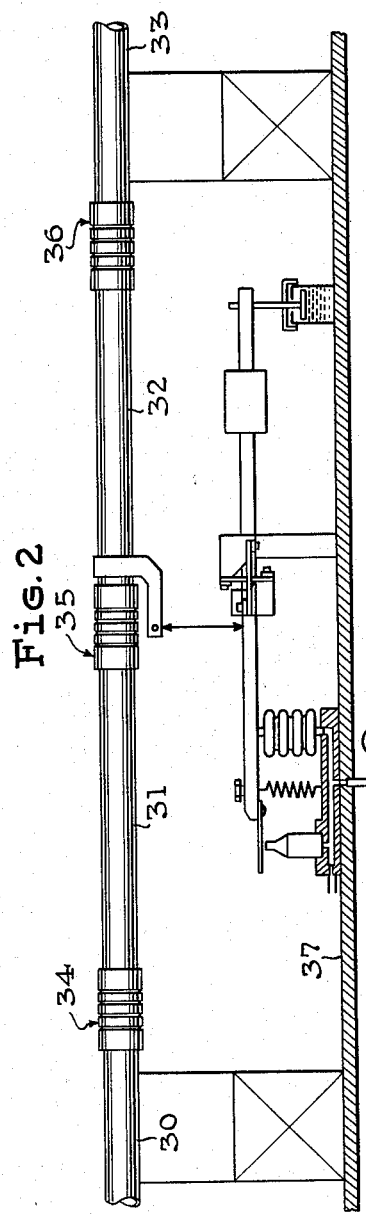
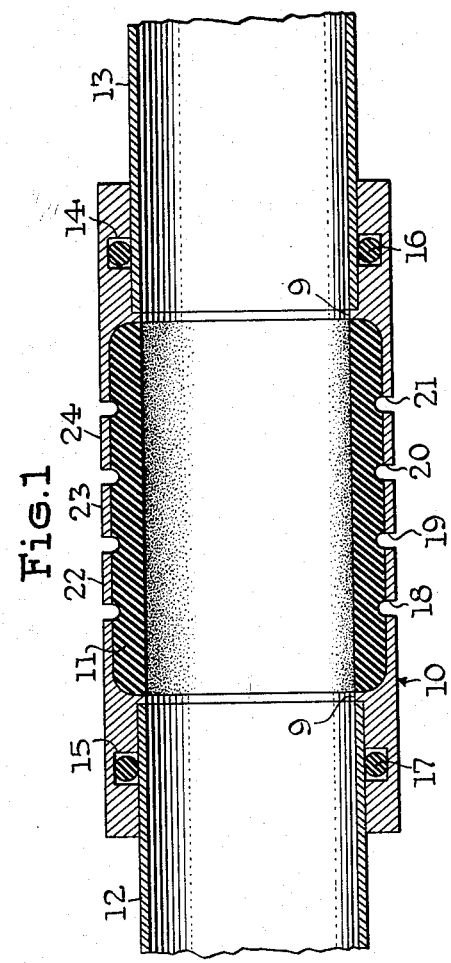
INVENTORS
Don H. Hathorn
and Forrest C. Pittman
BY *Kenon, Palmer & Stewart*
ATTORNEYS

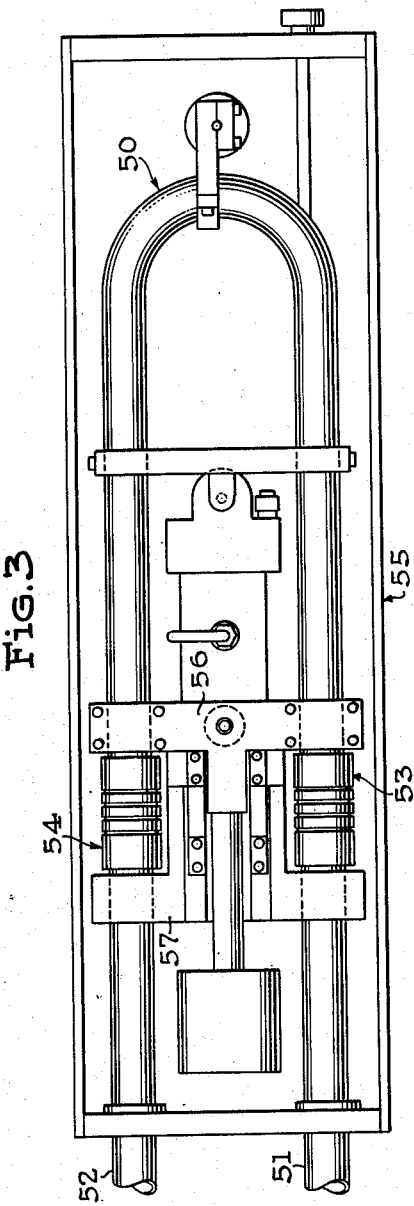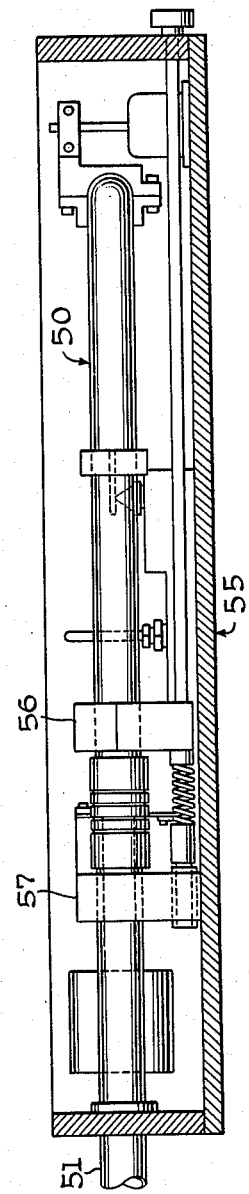

United States Patent Office 3,143,887
Patented Aug. 11, 1964

3,143,887
DENSITY METERS
Don H. Hathorn and Forrest C. Pittman, Duncan, Okla., assignors to Halliburton Company, a corporation of Delaware
Filed Dec. 14, 1959, Ser. No. 859,394
1 Claim. (Cl. 73—434)

This invention relates to density meters and more particularly to density meters of the type which provide a continuous indication of fluid density. Specifically, the present invention relates to certain structural details of density meters of the foregoing type and will be described with reference to apparatus falling within the foregoing definition and the operating details of which are fully disclosed in two prior applications of the same assignee as the present case, namely Copland et al., S. N. 803,772, filed Apr. 2, 1959, now Patent No. 3,039,310, and Love, S. N. 839,730, filed Sept. 14, 1959, now abandoned. The density meters as shown and described in the aforementioned pending applications have as their generic feature a conduit or conduits, through which fluid is to be pumped and density thereof determined, which conduits are free to deflect vertically in response to gravity as fluids of different weights are pumped therethrough. In one case, the deflectible conduit is in the form of a U-tube and in the other there are a series of straight conduits connected in a straight line relationship so that a pair of adjacent conduits is free to deflect in the vertical plane. In each instance, an air operated servo rebalancing apparatus is employed to automatically restore the deflectible conduit to its position of zero deflection. The amount of air pressure necessary to accomplish this result is then measured and this value is, of course, directly proportional to the density of the fluid in the conduit.

Some form of flexible connection for linking the deflectible conduits of apparatus of this type to the fixed conduits which furnish the supply and return lines for fluid to be pumped therethrough must be provided. In the earliest attempts to achieve a satisfactory connection of this type, plain resilient hoses of various materials were connected at opposite ends to the fixed and movable conduits by means of ordinary hose clamps and the like. Such arrangement was unsatisfactory for a number of reasons. The point of actual bending of the flexible connection was not readily determinable, nor was it uniform. Also some turbulence was created due to the difference in internal diameter between the flexible couplings and the conduits. It is these particular problems to which the apparatus of the present invention offers a satisfactory solution.

It is therefore the principal object of the present invention to provide a density meter with flexible couplings for the conduits which have particularly utility in increasing the sensitivity and accuracy in the measurements.

A further object is to provide density meters with flexible couplings which have low hysteresis and uniform variation with temperatures.

Other objects and a complete understanding of the present invention will be apparent from a consideration of the following specification and claims when read in conjunction with the attached sheets of drawings in which:

FIG. 1 is a detailed sectional view of a flexible coupling in accordance with the present invention;

FIG. 2 is a side elevation showing diagrammatically a straight line form of density measuring apparatus, and FIGS. 3 and 4 are top plan and side elevations respectively of a U-tube type of density measuring apparatus.

The couplings used in the present invention will first be described. Each coupling is made by bonding a resilient tube to the inner surface of a metallic sleeve. The metallic sleeve is then cut away at a plurality of points to form a plurality of spaced but normally axially aligned rings. By virtue of the bonding operation, the structure is unitary but flexible.

Referring now to FIG. 1 of the drawings, the outer metallic sleeve is shown at 10. A portion of the inner wall of the sleeve 10 is machined out to define a cavity to snugly receive a section of resilient tubing 11. Opposite ends of the sleeve 10 are further countered or machined to provide correctly sized openings for the snug reception of conduits 12 and 13. This leaves metal shoulders 9 at each end of the resilient tubing, which prevent extrusion of the resilient tubing when the coupling is in use. Annular grooves 14 and 15 are also machined into the opposite end portions of the sleeve 10 to receive rubber or other resilient O-rings 16 and 17 which act as fluid seals between the sleeve 10 and the inserted members 12 and 13. The resilient tube 11 is rigidly attached to the inner surfaces of the sleeve 10 as, for example, by bonding. Following the bonding operation, the sleeve 10 is then cut into a series of spaced axial rings. While four such cuts are indicated at 18, 19, 20 and 21, to therefore define three equally sized rings 22, 23 and 24, the number is not particularly critical. Thus each sleeve 10 is cut to provide a number of rings, the inner ones of which prevent excessive radial distortion of the tube 11 and the outer ones of which prevent axial extrusion due to the shoulders 9.

It will also be noted from an examination of FIG. 1 that the depths of the cuts 18 to 21 inclusive is such as to go entirely through the wall of the sleeve 10 and somewhat beyond, therefore extending into the outer surface of the tube 11. Regardless then of the plane of deflection of the coupling, those portions of the resilient tube which are away from the direction of bend will be placed in tension, while those portions on the opposite sides will be in compression. It should be further noted that the configuration of the cuts 18 to 21 inclusive is such as to have a radius at the base of the cut in the resilient tube and this helps to prevent tearing of the tube under operating conditions.

It should be noted that the depth of machining of the cavity in the sleeve 10 is such that the resilient tubing is entirely received therein. The internal diameter of the tubing 11 is exactly the same as the internal diameter of the sleeve 10 at the shoulders 9, and exactly the same as the internal diameter of the couplings 12 and 13. This provides a smooth flow path for fluids under test. In operation, the velocity of fluid flow is preferably sufficiently high to prevent settling of suspended matter but not high enough to result in turbulence. The smooth flow path permits a sufficiently high velocity of flow without turbulence to achieve this result.

Referring now to FIG. 2 of the attached drawings, there is shown in diagrammatic form a density measuring apparatus of the straight line type and which includes three of the flexible couplings described with reference to FIG. 1. The conduit or fluid carrying portion of the density meter shown in FIG. 2 includes four straight conduits 30 to 33 inclusive which are normally in axial alignment. Each of these conduits has an end portion like that shown at 12 or 13 in FIG. 1. The four conduits are joined at 34, 35 and 36 by flexible connectors as described with reference to FIG. 1. The outer conduits 30 and 33 are rigidly supported on a base member 37 which also forms a support for an air operated servo rebalancing system. It will be obvious that the center conduits 31 and 32 will be deflected in a vertical direction due to the force of gravity acting on fluids of different specific gravity or density as they are pumped through the four conduit sections. The operation of the servo rebalancing mechanism is fully described in the aforementioned copending applications, but for purposes of the present disclosure, it will be sufficient to note that the rebalancing system tends to restore the conduit system to a position of zero deflection, and the air pressure necessary to achieve this result is continuously measured to give a continuous indication of the density of fluids passing through the conduit sections.

While not shown in the drawing, the exact point of flexure of the members 34 and 35 is stabilized by the use of four crossed leaf springs, disposed in pairs on opposite sides of the joint and having opposite ends connected to opposite sides of the joint. The point of bending then falls on an axis defined by a line defined by the intersection of the springs of each pair. In the case of the center section 35, only a single leaf spring on each side is used.

FIGS. 3 and 4 show another form of fluid density measuring apparatus in which the deflectible conduit portion is in the shape of a U-tube which is indicated at 50 in the drawings. In this type of apparatus, only 2 of the flexible connections as shown in FIG. 1 are needed in order to couple the movable U-tube 50 to the supply and exhaust conduits 51 and 52. The flexible connections are indicated at 53 and 54. The U-tube 50 is caused to pivot about a specific axis, namely the geometric center of the flexible couplings 53 and 54 by reason of a support which comprises oppositely disposed pairs of flat leaf springs, each pair crossing at right angles. The design is such that a straight line which is defined by the planes of intersection of the two leaf springs on each side of the support passes directly through the geometric center of the couplings 53 and 54. As is the case for the straight line conduit apparatus as described with reference to FIG. 2 of the drawings, the U-tube model also includes an air-operated servo rebalancing system. In the straight-line conduit apparatus, the connection between the deflectible conduit and the servo system is by way of an intermediate weighing beam, while in the apparatus shown in FIGS. 3 and 4, the servo system is connected directly to the vertically deflectible U-tube 50. The principle of operation in both cases, however, is identical, at least to the extent that the air pressure necessary to effect the rebalancing is continuously monitored to give an indication of the density of fluids passing through the deflectible conduit portions. In the U-tube embodiment of FIGS. 3 and 4, the supply conduits 51 and 52 are of course rigidly attached to a base member 55 which also forms a support for the servo rebalancing system. Adjacent the open ends of the U-tube 50 there is placed a saddle member 56. A similar saddle member surrounds the supply and exhaust conduits 51 and 52 and is indicated at 57. It is these two saddle members, one of course being rigidly attached to the base 55 and the other being connected on the one hand to the free ends of the U-tube and then through oppositely disposed pairs of leaf springs which define the pivotal support axis of the deflectible tube.

The foregoing describes preferred embodiments of the present invention and illustrates two different forms of density measuring apparatus. The materials of the components of the flexible coupling are not believed to be especially critical, but the outer member is formed of rigid inflexible material preferably brass or steel. The inner tube of the flexible member should be formed of resilient material having low hysteresis, and as one example of such a material which has proven satisfactory in actual use, neoprene is suggested. This latter material is particularly useful because of its uniform variation with temperature changes. Other resilient materials will no doubt be equally operative and will occur to those who are familiar with the physical properties in question.

Variations of the present invention are contemplated and intended to be embraced within the scope of the appended claim.

We claim:

In a densometer, the combination with a tubular conduit which is deflected in response to the weight of a fluid being pumped therethrough, flexible coupling means for attaching said conduit to a fixed conduit which supplies fluid to be tested, said flexible coupling means consisting of a plurality of normally aligned rings spaced axially from each other;

a resilient tube rigidly attached to the inner surfaces of each of said rings, the internal diameter of the flexible coupling means being exactly the same as the internal diameters of said conduits;

the outer rings of said flexible coupling means having an internal diameter less than the internal diameter of the inner rings to provide shoulders at the ends of the resilient tube so as to prevent extrusion of the resilient tube and so that a smooth path of flow is defined through the flexible coupling means;

and two pairs of flat leaf springs positioned on opposite sides of said coupling means, opposite ends of each pair being connected to the deflectable and fixed conduits, the springs of each pair being adjacent and at right angles to each other and the pairs being so located that a line defined by the intersection of two planes, each established by corresponding springs at each pair, passes through the center of said flexible coupling means.

References Cited in the file of this patent

UNITED STATES PATENTS

| | | |
|---|---|---|
| 32,159 | Waite | Apr. 28, 1861 |
| 1,138,281 | Dodge | May 4, 1915 |
| 1,988,527 | Truman | Jan. 22, 1935 |
| 2,137,797 | Berger | Nov. 22, 1938 |
| 2,243,265 | Thomson | May 27, 1941 |
| 2,719,018 | Sebardt | Sept. 27, 1955 |
| 2,738,993 | Wilson | Mar. 20, 1956 |
| 2,807,480 | Hughes | Sept. 24, 1957 |
| 2,886,066 | Hansen | May 12, 1959 |
| 3,039,310 | Copland et al. | June 19, 1962 |

FOREIGN PATENTS

| | | |
|---|---|---|
| 865,244 | Germany | Dec. 18, 1952 |
| 776,926 | Great Britain | June 12, 1957 |